United States Patent
Hashizume et al.

(10) Patent No.: US 7,045,212 B2
(45) Date of Patent: May 16, 2006

(54) COLOR METALLIC PIGMENT AND RESIN COMPOSITION CONTAINING COLOR METALLIC PIGMENT

(75) Inventors: Yoshiki Hashizume, Osaka (JP); Taro Morimitsu, Osaka (JP)

(73) Assignee: Toyo Aluminium Kabushiki Kaisha, Osaka (JP)

( * ) Notice: Subject to any disclaimer, the term of this patent is extended or adjusted under 35 U.S.C. 154(b) by 0 days.

(21) Appl. No.: 10/510,012

(22) PCT Filed: Apr. 3, 2003

(86) PCT No.: PCT/JP03/04261

§ 371 (c)(1),
(2), (4) Date: Sep. 30, 2004

(87) PCT Pub. No.: WO03/082991

PCT Pub. Date: Oct. 9, 2003

(65) Prior Publication Data

US 2005/0147821 A1 Jul. 7, 2005

(30) Foreign Application Priority Data

Apr. 3, 2002 (JP) ............................ 2002-101656

(51) Int. Cl.
B32B 5/16 (2006.01)

(52) U.S. Cl. .................... 428/403; 428/404; 428/405; 428/406; 428/407; 428/328

(58) Field of Classification Search ................ 428/403, 428/404, 405, 406, 407, 328
See application file for complete search history.

(56) References Cited

U.S. PATENT DOCUMENTS

| | | | |
|---|---|---|---|
| 4,328,042 A | 5/1982 | Ostertag et al. | |
| 4,867,794 A | 9/1989 | Ambrosius et al. | |
| 5,364,467 A * | 11/1994 | Schmid et al. | 106/404 |
| 5,624,486 A * | 4/1997 | Schmid et al. | 106/404 |
| 5,662,738 A * | 9/1997 | Schmid et al. | 106/404 |
| 5,766,334 A * | 6/1998 | Hashizume et al. | 106/403 |
| 5,912,283 A * | 6/1999 | Hashizume et al. | 523/213 |
| 5,944,886 A * | 8/1999 | Hashizume | 106/404 |
| 6,022,911 A * | 2/2000 | Hashizume et al. | 523/213 |
| 6,060,165 A * | 5/2000 | Asada et al. | 428/403 |
| 6,830,822 B1 * | 12/2004 | Yadav | 428/552 |

FOREIGN PATENT DOCUMENTS

| | | |
|---|---|---|
| EP | 0571836 | 12/1993 |
| EP | 0668329 | 8/1995 |
| JP | 51-150532 | 12/1976 |
| JP | 56-120771 | 9/1981 |
| JP | 58-141248 | 8/1983 |
| JP | 63-015861 | 1/1988 |
| JP | 63-161063 | 7/1988 |
| JP | 01-110568 | 4/1989 |
| JP | 01-311176 | 12/1989 |
| JP | 01-315470 | 12/1989 |
| JP | 02-000669 | 1/1990 |
| JP | 04-028771 | 1/1992 |
| JP | 05-508424 | 11/1993 |
| JP | 06-32994 | 2/1994 |
| JP | 08-209024 | 8/1996 |
| JP | 09-040885 | 2/1997 |
| JP | 09-059532 | 3/1997 |
| JP | 09-124973 | 5/1997 |
| JP | 09-328629 | 12/1997 |
| JP | 2001-316609 | 11/2001 |
| JP | 2002-038052 | 2/2002 |
| WO | WO91/04293 | 4/1991 |

\* cited by examiner

*Primary Examiner*—Leszek B. Kiliman
(74) *Attorney, Agent, or Firm*—W. F. Fasse; W. G. Fasse

(57) ABSTRACT

In order to provide a color metallic pigment capable of implementing diverse colors, excellent in finished appearance and weather resistance and manufacturable by a safe and simple manufacturing method, a color metallic pigment comprising metal particles and a single-layer or multilayer coat covering the surface of each metal particle characterized in that at least one layer of the single-layer or multilayer coat is a cobalt coat consisting of an anhydrous oxide film elementally containing cobalt is provided. This cobalt coat preferably contains a compound in composition expressed by at least one type of composition selected from a group consisting of $CoO$, $Co_2O_3$, $Co_3O_4$, $nCoO \cdot mAl_2O_3$ and $nCoO \cdot mSiO_2$ (n, m: arbitrary positive real numbers).

17 Claims, No Drawings

COLOR METALLIC PIGMENT AND RESIN COMPOSITION CONTAINING COLOR METALLIC PIGMENT

TECHNICAL FIELD

The present invention relates to a color metallic pigment. More specifically, the present invention relates to a color metallic pigment comprising a single-layer or multilayer coat. The present invention also relates to a resin composition containing the aforementioned color metallic pigment.

BACKGROUND TECHNIQUE

A film formed with a metallic paint reflects external incident light with a flaky metallic pigment contained in the film, for exhibiting a glittery design. The reflection of light presents a unique appearance excellent in design along with each color tone of the film.

With such characteristics, a metallic pigment mainly employing aluminum flakes as basic particles is applied to a metallic design for automobile paint finish, plastic paint finish, printing ink or a resin composition molding.

In recent years, a colorful and highly bright metallic pigment colored red, green, purple or the like has been desired following diversification of consumers' preference. However, the originally achromatic aluminum flakes forming a pigment presenting silver-gray luster cannot satisfy the aforementioned consumers' demand as such.

Therefore, many attempts have been made in order to solve these problems and satisfy the consumers' requirement for diverse colors. For example, Japanese Patent Laying-Open No. 58-141248, National Patent Publication No. 5-508424, Japanese Patent Laying-Open No. 1-315470, Japanese Patent Laying-Open No. 9-40885, Japanese Patent Laying-Open No. 9-59532 or Japanese Patent Laying-Open No. 9-124973 discloses a technique related to a color metallic pigment prepared by bonding a color pigment to metal particles.

A method of bonding a color pigment to the surfaces of metal particles and covering the same with coats consisting of a polymer composition is generally employed as a method of preparing such a color metallic pigment. Further, an organic pigment such as a diketopyrrolopyrrole-based, quinacridone-based, dioxazine-based, isoindolinone-based, condensed azo-based, threne-based, perinone-based, perylene-based, phthalone-based or phthalocyanine-based pigment or an inorganic pigment such as iron oxide or carbon black is generally used as the color pigment employed for such a color metallic pigment.

In this color metallic pigment, however, the color pigment bonded to the surfaces of the metal particles is disadvantageously easy to photo-deteriorate due to reflection of light on these surfaces. A pigment such as phthalocyanine green, phthalocyanine blue or iron oxide relatively excellent in light fastness must be selected in order to solve this problem, and hence the design of the obtained color metallic pigment is limited under the present circumstances.

On the other hand, Japanese Patent Laying-Open No. 63-161063, Japanese Patent Laying-Open No. 4-28771 or Japanese Patent Laying-Open No. 2001-316609 discloses a technique of forming a film of silicon oxide, titanium oxide or metal on the surface of a pearlescent pigment such as mica thereby providing a colored nacreous pigment provided with an interference color. However, the hiding power of this colored nacreous pigment is so small that the pigment cannot sufficiently conceal the ground when compounded with a paint or ink.

With respect to these problems, some techniques have been disclosed in relation to a color metallic pigment obtained by coating the surfaces of metal particles having high hiding power with interference films of silicon oxide, aluminum oxide or titanium oxide.

For example, Japanese Patent Laying-Open No. 1-110568 or Japanese Patent Laying-Open No. 2-669 discloses a method of depositing titanium oxide on the surfaces of metal particles by a sol-gel method. According to this method, however, no color metallic pigment having high chroma can be obtained but the titanium oxide layers must be in an active anatase phase, to disadvantageously prompt deterioration of resin and reduce weather resistance when compounded with a paint or the like.

Japanese Patent Laying-Open No. 56-120771, Japanese Patent Laying-Open No. 1-311176 or Japanese Patent Laying-Open No. 6-32994 discloses a method of obtaining a composite phase of iron oxide, titanium oxide or metallic oxide and carbon, metal or metallic oxide on the surfaces of metal particles by a gas phase method. When employing the gas phase method, however, it is necessary to fluidize the metal particles and supply a precursor of metallic oxide for heating/depositing the same, while a specific apparatus is required, the metal particles are remarkably in danger of dust explosion, and the precursor of the metallic oxide is generally hard to handle due to strong toxicity.

Japanese Patent Laying-Open No. 8-209024 discloses a technique related to a multilayer coat metallic pigment based on a two-layer structure of a colorless cover layer having a refractive index of not more than 1.8 and a selective absorption layer having a refractive index of at least 2.0. However, while this technique discloses a method of forming metallic oxide layers on the surfaces of metal particles by the gas phase method or a method of hydrolyzing a metallic compound in a solution, the gas phase method has the aforementioned disadvantage, and the hydrolytic reaction is caused in a basic or acidic atmosphere containing a large quantity of water in the method of hydrolyzing the metallic compound in the solution for forming the metal oxide layers and hence the metal particles may react with the water during a treatment step to disadvantageously result in agglomeration of the metal particles or acceleration of the reaction.

Japanese Patent laying-Open No. 51-150532 or Japanese Patent Laying-Open No. 63-15861 discloses a method of mixing aluminum powder, metallic salt and a chelate compound with each other for depositing a metallic oxide layer. However, the method described in Japanese Patent Laying-Open No. 51-150532, carried out in an aqueous solution with the aluminum powder remarkably in danger of strongly reacting with the solution for the treatment, may unpractically cause a problem such as generation of a large quantity of hydrogen gas, remarkable heat generation resulting from acceleration of reaction or agglomeration of the aluminum powder.

Also in the method described in Japanese Patent Laying-Open No. 63-15861, it is difficult to avoid the aforementioned problem resulting from strong reaction between the aluminum powder and the solution for the treatment, while the reaction is caused in an acidic to neutral region and hence deposition of the metallic compound is not efficiently performed but unreacted metallic salt disadvantageously remains in a large quantity.

The metallic oxide layer obtained by this method, formed by a hydrated film containing water, is inferior in adhesiveness to a binder such as resin contained in the paint and tends to cause a problem such as peeling or reduction of moisture resistance with time. Further, the film of the aforementioned metallic oxide layer formed by the hydrated film tends to be incomplete, and disadvantageously exhibits rather inferior color development in general.

DISCLOSURE OF THE INVENTION

While development of a color metallic pigment capable of implementing diverse colors, excellent in finished appearance and weather resistance and manufacturable by a safe and simple manufacturing method is strongly demanded as hereinabove described, a technique related to such a color metallic pigment is still unknown.

On the basis of the aforementioned circumstances, an object of the present invention is to provide a color metallic pigment capable of implementing diverse colors, excellent in finished appearance and weather resistance and manufacturable by a safe and simple manufacturing method.

Another object of the present invention is to provide a resin composition capable of implementing diverse colors, excellent in finished appearance and weather resistance and manufacturable by a safe and simple manufacturing method.

The inventors have obtained such an idea that light interference may be utilized for attaining the aforementioned objects by providing a single-layer or multilayer coat containing dissimilar metallic elements on the surface of a metal particle forming each base particle by a safe and simple method, and made deep study as to various types of metallic elements.

As a result of trial and error, the inventors have found out that an anhydrous oxide film elementally containing cobalt can be safely and simply provided on the metal particle forming each base particle when employing a specific manufacturing method so that a color metallic pigment having an excellent appearance can be obtained as a result.

The inventors have also found out that an oxide film or an oxynitride film containing dissimilar metallic elements such as titanium can be further safely and simply provided outside the aforementioned anhydrous oxide film elementally containing cobalt when employing a specific manufacturing method so that a color metallic pigment having more diverse colors can be obtained.

The inventors have found out that a coat elementally containing aluminum, silicon or cerium can be safely and simply provided outside the oxide film or the oxynitride film containing titanium when employing a specific manufacturing method so that the problem of weather resistance caused in the oxide film or the oxynitride film elementally containing titanium can be overcome, to complete the present invention.

The color metallic pigment according to the present invention is a color metallic pigment comprising metal particles and a single-layer or multilayer coat covering the surface of each metal particle, while at least one layer of the single-layer or multilayer coat is a cobalt coat consisting of an anhydrous oxide film elementally containing cobalt.

This cobalt coat preferably contains a compound in composition expressed by at least one type of composition selected from a group consisting of $CoO$, $Co_2O_3$, $Co_3O_4$, $nCoO \cdot mAl_2O_3$ and $nCoO \cdot mSiO_2$ (n, m: arbitrary positive real numbers).

This cobalt coat preferably has a thickness in the range of 0.01 to 1 μm. Further, it is recommended that this cobalt element is contained in the cobalt coat in the range of 0.5 to 50 parts by mass with respect to 100 parts by mass of the metal particles.

The color metallic pigment according to the present invention preferably comprises a silicon-aluminum coat consisting of an oxide film elementally containing silicon and/or aluminum inside this cobalt coat.

This silicon-aluminum coat preferably contains a compound in composition expressed by at least one type of composition selected from a group consisting of $Al_2O_3$, $SiO_2$, $SiO$ and $nSiO_2 \cdot mAl_2O_3$ (n, m: arbitrary positive real numbers).

It is recommended that this silicon-aluminum coat has a thickness in the range of 0.01 to 1 μm. Further, this silicon and/or aluminum is preferably elementally contained in the silicon-aluminum coat in the range of 0.01 to 50 parts by mass with respect to 100 parts by mass of the metal particles.

The color metallic pigment according to the present invention preferably comprises a molybdenum-phosphorus coat consisting of an oxide film elementally containing molybdenum and/or phosphorus on the surface of each metal particle.

It is recommended that this molybdenum-phosphorus coat contains a compound in composition expressed by at least one type of composition selected from a group consisting of $MoO_3$, $Mo_2O_3$, $MoO$, $nAl_2O_3 \cdot mMoO_3$, $nAl_2O_3 \cdot mMo_2O_3$, $nAl_2O_3 \cdot mMoO$, $P_2O_5$ and $nAl_2O_3 \cdot mP_2O_5$ (n, m: arbitrary positive real numbers).

This molybdenum and/or phosphorus is preferably elementally contained in the molybdenum-phosphorus coat in the range of 0.01 to 5.0 parts by mass with respect to 100 parts by mass of the metal particles.

It is recommended that the color metallic pigment according to the present invention comprises a second coat consisting of an oxide film or an oxynitride film containing at least one element selected from a group consisting of titanium, zirconium, zinc, iron, chromium and cerium outside this cobalt coat.

This second coat preferably consists of an oxide layer or an oxynitride film elementally containing titanium. This second coat preferably contains a compound in composition expressed by at least one type of composition selected from a group consisting of rutile, anatase, $TiO$, $Ti_2O_3$ and $Ti_3O_5$.

Further, it is recommended that this second coat has a thickness in the range of 0.01 to 1 μm. In addition, at least one element selected from this group consisting of titanium, zirconium, zinc, iron, chromium and cerium is preferably contained in the second coat in the range of 0.5 to 200 parts by mass with respect to 100 parts by mass of the metal particles.

The color metallic pigment according to the present invention preferably comprises a weather-resistant coat consisting of an oxide film containing at least one element selected from a group consisting of aluminum, silicon and cerium outside this second coat.

It is recommended that this weather-resistant coat contains a compound in composition expressed by at least one type of composition selected from a group consisting of $Al_2O_3$, $SiO_2$, $SiO$, $CeO_2$ and $Ce_2O_3$.

This weather-resistant coat preferably has a thickness in the rage of 0.01 to 0.1 μm. Further, at least one element selected from this group consisting of aluminum, silicon and cerium is preferably contained in the weather-resistant coat in the range of 0.01 to 5 parts by mass with respect to 100 parts by mass of the metal particles.

It is recommended that the metal particles employed for the color metallic pigment according to the present invention are flaky metal particles made of aluminum or an aluminum alloy.

Further, the present invention includes a resin composition containing the aforementioned color metallic pigment and resin.

BEST MODES FOR CARRYING OUT THE INVENTION

The present invention is now described in more detail with reference to an embodiment.

<Color Metallic Pigment>

The color metallic pigment according to the present invention is a color metallic pigment comprising metal particles and a single-layer or multilayer coat covering the surface of each metal particle, and at least one layer of the single-layer or multilayer coat is a cobalt coat consisting of an anhydrous oxide film elementally containing cobalt.

<Metal Particle>

The color metallic pigment according to the present invention comprises the metal particles as base particles.

The material for the metal particles forming the base particles of the color metallic pigment according to the present invention is not particularly restricted but aluminum, copper, zinc, titanium, iron, nickel, chromium or an alloy thereof can be preferably employed as the material. Among these materials, aluminum or an aluminum alloy, excellent in metallic luster and hiding power, low-priced and easy to handle due to small specific gravity, is particularly preferable.

While the shape of the metal particles employed for the present invention is not particularly restricted but can be selected from various shapes such as granular, platelike, aggregated and flaky (scaly) shapes, the metal particles are preferably flaky in order to supply excellent brightness to a film.

When the metal particles employed for the present invention are flaky, the average thickness of these metal particles is preferably at least 0.01 μm, more preferably at least 0.02 μm in particular. Further, the average thickness of these metal particles is preferably not more than 5 μm, more preferably not more than 2 μm in particular. Metal particles of less than 0.01 μm in average thickness are not industrially stably supplied and tend to be hard to obtain, while metal particles exceeding 5 μm in average thickness are not industrially stably supplied either and similarly tend to be hard to obtain.

When the metal particles employed for the present invention are flaky, the average particle diameter of these metal particles is preferably at least 2 μm, more preferably at least 5 μm in particular. Further, the average particle diameter of these metal particles is preferably not more than 300 μm, more preferably not more than 100 μm in particular. Metal particles of less than 2 μm in average particle diameter are not industrially stably supplied and tend to be hard to obtain, while metal particles exceeding 300 μm in average particle diameter are not industrially stably supplied either and similarly tend to be hard to obtain.

When the metal particles employed for the present invention are flaky, further, a shape factor obtained by dividing the average particle diameter of these metal particles by the average thickness is preferably at least 5, more preferably at least 50 in particular. Further, this shape factor is preferably not more than 1000, more preferably not more than 500 in particular. The metallic effect or the hiding property tends to lower if this shape factor is less than 5, while deformation or breaking tends to increase in a step of dispersion into a resin composition if this shape factor exceeds 1000.

When the metal particles employed for the present invention are flaky, in addition, the shape of each metal particle is more preferably a coin-like shape with a smooth surface having a rounded end surface due to clearness of an interference color.

When the metal particles employed for the present invention are flaky, a method of grinding powder or metal flakes obtained by atomization by wet ball milling (a.k.a. Hall process) or dry ball milling is preferable as the method of manufacturing the flaky metal particles. Alternatively, a method of forming a vacuum metallized thin film to a film consisting of a resin composition or the like, thereafter separating the same and disintegrating the same by the aforementioned disintegration method is also employable.

The average particle diameter of the metal particles employed for the present invention or the color metallic pigment described later is obtained by calculating the volume average from particle size distribution measured by a known particle size distribution measuring method such as laser diffraction, micromesh sieving or coulter counting. The average thickness is calculated from the hiding power and the density of the metal particles or the color metallic pigment.

No grinding aid added in grinding is preferably adsorbed to the surfaces of the metal particles employed for the present invention.

<Cobalt Coat>

The color metallic pigment according to the present invention is a color metallic pigment comprising metal particles and a single-layer or multilayer coat covering the surface of each metal particle, and at least one layer of the single-layer or multilayer coat is a cobalt coat consisting of an anhydrous oxide film elementally containing cobalt.

When the cobalt coat consisting of the anhydrous oxide film elementally containing cobalt is formed outside each metal particle, the metal particles can be colored green, yellow, brown etc., for obtaining the color metallic pigment according to the present invention.

A compound having composition such as $CoO$, $Co_2O_3$, $Co_3O_4$, $nCoO \cdot mAl_2O_3$ or $nCoO \cdot mSiO_2$ (n, m: arbitrary positive numbers) can be listed as a specific example of a compound contained in this cobalt coat. This cobalt coat may contain a small quantity of metallic cobalt in a range not damaging optical transmission of the cobalt coat.

The thickness of this cobalt coat is preferably at least 0.01 μm, more preferably at least 0.05 μm in particular. Further, this thickness is preferably not more than 1 μm, more preferably not more than 0.8 μm in particular. The color metallic pigment may exhibit no desired color if this thickness is less than 0.01 μm, while the luster of the color metallic pigment tends to lower if this thickness exceeds 1 μm.

The quantity of the cobalt element contained in this cobalt coat is preferably at least 0.5 parts by mass with respect to 100 parts by mass of the metal particles forming the base particles, more preferably at least 1 part by mass in particular. Further, the quantity of this cobalt element is preferably not more than 50 parts by mass, more preferably not more than 30 parts by mass in particular. There is a tendency that no color metallic pigment of a desired color is obtained if the quantity of this cobalt element is less than 0.5 parts by mass, while the luster of the color metallic pigment tends to lower if the quantity of this cobalt element exceeds 50 parts by mass.

<Cobalt Coat Forming Step>

While a method of forming the cobalt coat consisting of the anhydrous oxide film containing the cobalt element outside each metal particle employed as the base particle for the color metallic pigment according to the present invention is not particularly restricted, a method of adding a cobalt compound to a suspension prepared by suspending the metal particles or the metal particles each already covered with the single-layer or multilayer coat in a hydrophilic solvent and stirring or kneading the slurried or pasty suspension while keeping this suspension basic thereby forming a hydrated film containing the cobalt element outside each metal particle and thereafter converting this hydrated film to an anhydrous oxide film by heating or the like can be listed, for example. According to this method, the hydrated film is converted to the anhydrous oxide film due to heat treatment, whereby a color metallic pigment excellent in color development is obtained and adhesiveness between the color metallic pigment according to the present invention and binder resin contained in a paint is advantageously improved.

While the cobalt compound employed in the aforementioned method is not particularly restricted, cobalt nitrate, cobalt acetate, cobalt phosphate, cobalt chloride, cobalt sulfate, cobalt naphthenate, cobalt oxalate, cobalt citrate, cobalt 2-ethylhexanoate, cobalt gluconate, cobalt chromate or cobalt carbonate can be listed, for example. Among these cobalt compounds, particularly preferable compounds are cobalt nitrate, cobalt acetate and cobalt chloride.

Further, while the hydrophilic solvent employed for the suspension is not particularly restricted in the aforementioned case, methyl alcohol, ethyl alcohol, isopropyl alcohol, n-propyl alcohol, t-butyl alcohol, n-butyl alcohol, isobutyl alcohol, ethyl cellosolve, butyl cellosolve, propylene glycol monobutyl ether, dipropylene glycol monomethyl ether, propylene glycol monopropyl ether or acetone can be listed, for example. The aforementioned suspension may contain water.

In the aforementioned method, it is particularly preferable to add an amino compound to a suspension prepared by suspending the metal particles or the metal particles each already covered with the single-layer or multilayer coat, adsorbing this amino compound to the surface of the metal particle or the metal particle already covered with the single-layer or multilayer coat while keeping the pH in the basic range, thereafter add an aqueous solution prepared by dissolving the cobalt compound and perform heating/stirring thereby depositing a cobalt hydrated film or the cobalt compound on the surface of the metal particle or the metal particle already covered with the single-layer or multilayer coat for finally heat-treating the same at a high temperature. It is recommended to previously solid-liquid separate paste containing the metal particles each having the hydrated film from the aforementioned suspension before the final heat treatment.

While the amino compound employed for adjusting the pH of the suspension in the aforementioned case is not particularly restricted, monoethanolamine, diethanolamine, triethanolamine, ammonia, ethylenediamine, t-butylamine, γ-aminopropyl triethoxysilane, N-2-aminoethyl-3-aminopropyl triethoxysilane, N-2-aminoethyl-3-aminopropylmethyl dimethoxysilane, urea or O-aminobenzoic acid can be listed, for example.

When keeping the pH in the basic range by adding the amino compound in the aforementioned case, the kept pH is preferably at least 7.0, more preferably at least 8.0 in particular. Further, this pH is preferably not more than 14.0, more preferably not more than 10.0 in particular. Deposition of the cobalt compound may be insufficiently caused if this pH is less than 7.0, while it is generally difficult to adjust this pH to a value exceeding 14.0.

When adding the aqueous solution prepared by dissolving the cobalt compound and performing heating/stirring in the aforementioned case, the temperature of the suspension is preferably at least 20° C., more preferably at least 50° C. in particular. Further, this temperature is preferably not more than 120° C., particularly preferably not more than 100° C. The cobalt compound tends to be incompletely deposited if this temperature is less than 20° C., while the cobalt compound tends to precipitate on a portion other than the surface of each basic metal particle if this temperature exceeds 120° C.

When adding the aqueous solution prepared by dissolving the cobalt compound and performing heating/stirring in the aforementioned case, further, the time for heating/stirring is preferably at least 5 minutes, more preferably at least 30 minutes in particular. Further, this time is preferably not more than 10 hours, particularly preferably not more than 3 hours. The cobalt compound tends to be incompletely deposited if this time is less than 5 minutes, while deposition of the cobalt compound tends not to further progress to result in economic disadvantage if this time exceeds 10 hours.

When finally performing heat treatment at a high temperature after solid-liquid separation in the aforementioned case, the temperature for the heat treatment is preferably at least 250° C., more preferably at least 350° C. in particular. Further, this temperature is preferably not more than 700° C., particularly preferably not more than 650° C. Color development tends to deteriorate due to insufficient vaporization of water of crystallization if this temperature is less than 250° C., while agglomeration of the metal particles tends to easily occur if this temperature exceeds 700° C.

When finally performing heat treatment at a high temperature in the aforementioned case, the time for the heat treatment is preferably at least 30 minutes, more preferably at least 1 hour in particular. Further, this time is preferably not more than 20 hours, particularly preferably not more than 10 hours. Color development of the color metallic pigment tends to deteriorate if this time is less than 30 minutes, while the color tone of the obtained color metallic pigment tends to darken if this time exceeds 20 hours.

<Silicon-Aluminum Coat>

The color metallic pigment according to the present invention preferably comprises a silicon-aluminum coat consisting of an oxide film elementally containing silicon and/or aluminum inside the cobalt coat.

When the silicon-aluminum coat consisting of the oxide film elementally containing silicon and/or aluminum is provided inside the cobalt coat, the coloring effect with the cobalt coat is enhanced while an effect of preventing reducing reaction of the oxide in the cobalt coat with each metal particle is attained.

A compound having composition such as $Al_2O_3$, $SiO_2$, $SiO$ or $nSiO_2 \cdot mAl_2O_3$ (n, m: arbitrary positive real numbers) can be listed as a specific example of the compound elementally containing silicon and/or aluminum contained in this silicon-aluminum coat.

The thickness of this silicon-aluminum coat is preferably at least 0.01 μm, more preferably at least 0.05 μm in particular. Further, this thickness is preferably not more than 1 μm, more preferably not more than 0.5 μm in particular. The color tone of the obtained color metallic pigment tends to darken if this thickness is less than 0.01 µm, while the luster of the color metallic pigment tends to lower if this thickness exceeds 1 µm.

The elemental quantity of silicon and/or aluminum contained in this silicon-aluminum coat is preferably at least 0.01 parts by mass with respect to 100 parts by mass of the metal particles forming the base particles, more preferably at least 0.2 parts by mass in particular. Further, this quantity is preferably not more than 50 parts by mass, more preferably not more than 20 parts by mass in particular. The color tone of the obtained color metallic pigment tends to darken if this quantity is less than 0.01 parts by mass, while the luster of the color metallic pigment tends to lower if this quantity exceeds 50 parts by mass.

<Silicon-Aluminum Coat Forming Step>

While a method of forming the silicon-aluminum coat consisting of the oxide film elementally containing silicon and/or aluminum inside the cobalt coat provided on the color metallic pigment according to the present invention is not particularly restricted, a method of adding a silicon compound and/or an aluminum compound to a slurried or pasty suspension prepared by suspending the metal particles or the metal particles each already covered with the single-layer or multilayer coat in a hydrophilic solvent, performing stirring or kneading while keeping the pH of the suspension basic or acidic thereby forming a hydrated film elementally containing silicon and/or aluminum on the surface of the metal particle or the metal particle already covered with the single-layer or multilayer coat for finally performing heat treatment at a high temperature and converting the hydrated film to an oxide film is preferable, for example. It is recommended to previously solid-liquid separate the paste containing the metal particles having the hydrated film from the aforementioned suspension before the final heat treatment.

While the silicon compound and/or the aluminum compound employed in the aforementioned method is not particularly restricted, methyl triethoxysilane, methyl trimethoxysilane, tetraethoxysilane, tetramethoxysilane or tetraisopropoxysilane, a condensate thereof, γ-aminopropyl triethoxysilane, N-2-aminoethyl-3-aminopropyl triethoxysilane, N-2-aminoethyl-3-aminopropyl methyldimethoxysilane, sodium silicate, silicotungstic acid, silicomolybdic acid, triethoxyaluminum, trimethoxyaluminum, triisopropoxy aluminum or a condensate thereof or aluminum nitrate can be listed, for example.

While the hydrophilic solvent employed for the suspension in the aforementioned case is not particularly restricted, methyl alcohol, ethyl alcohol, isopropyl alcohol, n-propyl alcohol, t-butyl alcohol, n-butyl alcohol, isobutyl alcohol, ethyl cellosolve, butyl cellosolve, propylene glycol monobutyl ether, dipropylene glycol monomethyl ether, propylene glycol monopropyl ether or acetone can be listed, for example. The aforementioned suspension may contain water.

When keeping the pH of the suspension in the acidic range in the aforementioned case, the kept pH is preferably at least 1.0, more preferably at least 2.0 in particular. Further, this pH is preferably not more than 5.0, more preferably not more than 4.0 in particular. The danger of acceleration of reaction tends to increase if this pH is less than 1.0, while the silicon-aluminum coat consisting of the oxide film elementally containing silicon and/or aluminum tends to be insufficiently formed if this pH exceeds 5.0.

When keeping the pH of the suspension in the basic range in the aforementioned case, the kept pH is preferably at least 7.0, more preferably at least 8.0 in particular. Further, this pH is preferably not more than 14.0, more preferably not more than 10.0 in particular. The silicon-aluminum coat consisting of the oxide film elementally containing silicon and/or aluminum tends to be insufficiently formed if this pH is less than 7.0, while danger of acceleration of reaction tends to increase if this pH exceeds 14.0.

When adding the silicon compound and/or the aluminum compound and performing stirring or kneading in the aforementioned case, the temperature of the suspension is preferably at least 20° C., more preferably at least 50° C. in particular. Further, this temperature is preferably not more than 120° C., particularly preferably not more than 80° C. There is a tendency that no desired thickness of the silicon-aluminum coat is obtained if this temperature is less than 20° C., while there is a tendency that no silicon-aluminum coat is deposited outside each metal particle if this temperature exceeds 120° C.

When adding the silicon compound and/or the aluminum compound and performing stirring or kneading in the aforementioned case, the time for stirring or kneading is preferably at least 30 minutes, more preferably at least 1 hour in particular. Further, this time is preferably not more than 50 hours, more preferably not more than 20 hours in particular. Deposition of the coat tends to insufficiently occur if this time is less than 30 minutes, while there is a tendency that no further deposition of the coat occurs to result in economic disadvantage if this time exceeds 50 hours.

<Molybdenum-Phosphorus Coat>

The color metallic pigment according to the present invention preferably comprises a molybdenum-phosphorus coat consisting of an oxide film elementally containing molybdenum and/or phosphorus on the surface of the metal particle forming each base particle.

When the molybdenum-phosphorus coat consisting of the oxide film elementally containing molybdenum and/or phosphorus is formed on the surface of the metal particle forming each base particle, homogeneous deposition of the coat formed thereon is facilitated. The molybdenum-phosphorus coat has corrosion resistance, whereby an effect of preventing abnormal reaction between a treatment solution and the metal particle is also attained in a subsequent step of forming the coat.

A compound having composition such as $MoO_3$, $Mo_2O_3$, $MoO$, $nAl_2O_3 \cdot mMoO_3$, $nAl_2O_3 \cdot mMo_2O_3$, $nAl_2O_3 \cdot mMoO$, $P_2O_5$ or $nAl_2O_3 \cdot mP_2O_5$ (n, m: arbitrary positive real numbers) can be listed as a specific example of the compound elementally containing molybdenum and/or phosphorus contained in this molybdenum-phosphorus coat.

The elemental quantity of molybdenum and/or phosphorus contained in this molybdenum-phosphorus coat is preferably varied with the specific surface area of the metal particle employed as the base particle. In other words, it can be said preferable to increase the elemental quantity of molybdenum and/or phosphorus with respect to a metal particle having a large specific surface area and to reduce the elemental quantity of molybdenum and/or phosphorus with respect to the metal particle having a small specific surface area.

In a general case, however, the elemental quantity of molybdenum and/or phosphorus contained in this molybdenum-phosphorus coat is preferably at least 0.01 parts by mass with respect to 100 parts by mass of the metal particles forming the base particles, more preferably at least 0.05 parts by mass in particular. Further, this quantity is preferably not more than 5.0 parts by mass, more preferably not more than 2.0 parts by mass in particular. There is a tendency that desired chemical stability is hard to obtain if this quantity is less than 0.01 parts by mass, while there is a tendency for such inconvenience that the color tone (i.e., metallic luster) of the color metallic pigment is remarkably lowered, the color metallic pigment flocculates, physical film properties such as moisture resistance, adhesiveness and weather resistance are reduced if this quantity exceeds 5.0 parts by mass.

<Molybdenum-Phosphorus Coat Forming Step>

While a method of forming the molybdenum-phosphorus coat consisting of the oxide film elementally containing molybdenum and/or phosphorus on the surface of the metal particle forming each base particle of the color metallic pigment according to the present invention is not particularly restricted, a method of adding an aqueous solution prepared by dissolving a molybdenum compound in hydrogen peroxide water and/or a phosphorus compound to a slurried or pasty suspension prepared by suspending the metal particles in a hydrophilic solvent and performing stirring or kneading thereby forming a hydrated film elementally containing molybdenum and/or phosphorus on the surface of each metal particle and finally performing heat treatment at a high temperature for converting the hydrated film to an oxide film is preferable, for example. It is recommended to previously solid-liquid separate the paste containing the metal particles each having the hydrated film from the aforementioned suspension before the final heat treatment.

While the molybdenum compound employed in the aforementioned method is not particularly restricted, polymolybdic peroxide expressed in a composition formula: $Mo_xO_y \cdot mH_2O_2 \cdot nH_2O$ (x denotes an integer of 1 or 2, y denotes an integer of 2 to 5 and $m$ and $n$ denote arbitrary positive real numbers), ammonium molybdate or phosphomolybdic acid can be listed, for example. Polymolybdic peroxide can be prepared by dissolving metallic molybdenum powder or molybdenum oxide in a hydrogen peroxide solution (concentration: 5 to 40%).

While the phosphorus compound employed in the aforementioned method is not particularly restricted, orthophosphoric acid, phosphorous acid, hypophosphorous acid, phosphinic acid, pyrophosphoric acid or polyphosphoric acid can be listed, for example.

While the hydrophilic solvent employed for the suspension in the aforementioned case is not particularly restricted, methyl alcohol, ethyl alcohol, isopropyl alcohol n-propyl alcohol, t-butyl alcohol, n-butyl alcohol, isobutyl alcohol, ethyl cellosolve, butyl cellosolve, propylene glycol monobutyl ether, dipropylene glycol monomethyl ether, propylene glycol monopropyl ether or acetone can be listed, for example. The aforementioned suspension may contain water.

When adding the aqueous solution prepared by dissolving the molybdenum compound to the hydrogen peroxide water and/or the phosphorus compound and performing stirring or kneading in the aforementioned case, the pH of the suspension is preferably at least 1.0, more preferably at least 2.0 in particular. Further, this pH is preferably not more than 10.0, more preferably not more than 8.0 in particular. The metal particles tend to easily flocculate if this pH is less than 1.0 or in excess of 10.0.

<Second Coat>

The color metallic pigment according to the present invention preferably comprises a second coat consisting of an oxide film or an oxynitride film containing at least one element selected from a group consisting of titanium, zirconium, zinc, iron, chromium and cerium outside the cobalt coat.

When the second coat consisting of the oxide film or the oxynitride film containing at least one element among titanium, zirconium, zinc, iron, chromium and cerium is further formed outside the cobalt coat, the color tone of the color metallic pigment can be rendered more multicolored. Among these, an oxide film or an oxynitride film elementally containing titanium is particularly preferable since an excellent interference color is easy to obtain.

A titanium oxide such as rutile, anatase, TiO, $Ti_2O_3$ or $Ti_3O_5$ or a titanium oxynitride can be listed as a specific example of the compound elementally containing titanium contained in this second coat. Among these, the titanium oxide such as rutile, TiO, $Ti_2O_3$ or $Ti_3O_5$ or the titanium oxynitride is particularly preferable.

Rutile-type titanium oxide can be formed at a relatively low temperature by forming a hydrated film elementally containing titanium on the outer surface of the cobalt coat and heating the same, and hence a second coat containing rutile-type titanium oxide can be formed also in the color metallic pigment employing the metal particle made of a low melting point metal such as aluminum as the base particle.

The thickness of this second coat is preferably at least 0.01 µm, more preferably at least 0.05 µm in particular. Further, this thickness is preferably not more than 1 µm, more preferably not more than 0.8 µm in particular. The color metallic pigment tends to exhibit no desired color if this thickness is less than 0.01 µm, while the luster of the color metallic pigment tends to be damaged if this thickness exceeds 1 µm.

The quantity of at least one element selected from the group consisting of titanium, zirconium, zinc, iron, chromium and cerium contained in this second coat is preferably at least 0.5 parts by mass with respect to 100 parts by mass of the metal particles forming the base particles, more preferably at least 1.0 part by mass in particular. Further, this quantity is preferably not more than 200 parts by mass, more preferably not more than 100 parts by mass in particular. There is a tendency that a color metallic pigment having color traveling is hard to obtain if this quantity is less than 0.5 parts by mass, while the luster of the color metallic pigment tends to lower if this quantity exceeds 200 parts by mass.

<Second Coat Forming Step>

While a method of forming the second coat consisting of the oxide film or the oxynitride film containing at least one element selected from the group consisting of titanium, zirconium, zinc, iron, chromium and cerium outside the cobalt coat of the color metallic pigment according to the present invention is not particularly restricted, a method of adding a compound containing at least one element selected from the group consisting of titanium, zirconium, zinc, iron, chromium and cerium to a slurried or pasty pH-adjusted suspension prepared by suspending the metal particles each having the cobalt coat in a hydrophilic solvent and hydrolyzing this compound while performing stirring or kneading thereby depositing a hydrolysate of this compound on the outer surface of the cobalt coat provided on the metal particle, forming a hydrated film containing at least one element selected from the group consisting of titanium, zirconium, zinc, iron, chromium and cerium and finally performing heat treatment at a high temperature for converting the hydrated film to an oxide film or an oxynitride film is preferable, for example. It is recommended to previously solid-liquid separate the paste containing the metal particles each having the hydrated film and the cobalt coat from the aforementioned suspension before the final heat treatment.

While the compound elementally containing titanium employed in the aforementioned method is not particularly restricted, titanium alkoxide, a titanium chelate compound, a titanium coupling agent, titanium sulfate or titanium chloride can be listed, for example.

Tetrabutoxy titanium, tetraisopropoxy titanium, tetraethoxy titanium, tetrakis(2-ethylhexoxy)titanium or a condensate thereof, tetrastearoxy titanium, diisopropoxybis(acetylacetonato)titanium, dibutoxybis(triethanolaminato)titanium, dihydroxybis(lactato)titanium, isopropyltri(N-aminoethylaminoethyl)titanate or isopropyltris(dioctylpyrophosphate)titanate can be listed as a specific example of titanium alkoxide, the titanium chelate compound or the titanium coupling agent.

Among these compounds elementally containing titanium, tetrabutoxy titanium, tetraisopropoxy titanium, diisopropoxybis(acetylacetonato)titanium, dibutoxybis(triethanolaminato)titanium, dihydroxybis(lactato)titanium and isopropyltri(N-aminoethylaminoethyl)titanate are particularly preferable.

While the compound elementally containing zirconium, zinc, iron, chromium or cerium employed in the aforementioned method is not particularly restricted, tetrabutyl zirconate, zirconium acylate, zirconium acetylacetonate, diethoxyzinc, dimethoxyzinc, zinc acetate, ferric nitrate, chromic acid or cerium acetate can be listed, for example.

While the hydrophilic solvent employed for the suspension in the aforementioned case is not particularly restricted, methyl alcohol, ethyl alcohol, isopropyl alcohol, n-propyl alcohol, t-butyl alcohol, n-butyl alcohol, isobutyl alcohol, ethyl cellosolve, butyl cellosolve, propylene glycol monobutyl ether, dipropylene glycol monomethyl ether, propylene glycol monopropyl ether or acetone can be listed, for example. The aforementioned suspension may contain water.

More specifically, a method of adding the compound containing at least one element selected from the group consisting of titanium, zirconium, zinc, iron, chromium and cerium while keeping the pH of a slurried or pasty suspension prepared by suspending the metal particles each having the cobalt coat in a hydrophilic solvent and hydrolyzing this compound thereby depositing a hydrolysate of this compound on the outer surface of the cobalt coat provided on the metal particle, forming a hydrated film containing at least one element selected from the group consisting of titanium, zirconium, zinc, iron, chromium and cerium and finally performing heat treatment in the air or in a non-oxidizing atmosphere at a high temperature and converting the hydrated film to an oxide film or an oxynitride film is particularly preferable as a method of forming the second coat consisting of the oxide film or the oxynitride film containing at least one element selected from the group consisting of titanium, zirconium, zinc, iron, chromium and cerium outside the cobalt coat of the color metallic pigment according to the present invention.

In the aforementioned method, it is recommended to previously solid-liquid separate the paste containing the metal particles each having the hydrated film and the cobalt coat from the aforementioned suspension before the final heat treatment. In the final high-temperature heat treatment, a method of performing heating not in the air but in the non-oxidizing atmosphere is preferable. When forming not an oxide film but an oxynitride film, further, a method of performing heating in an atmosphere containing ammonia or nitrogen is preferable.

When adding the compound containing at least one element selected from the group consisting of titanium, zirconium, zinc, iron, chromium and cerium and performing stirring or kneading in the aforementioned case, the pH of the suspension is preferably at least 7.0, more preferably at least 8.0 in particular. Further, this pH is preferably not more than 14.0, more preferably not more than 10.0 in particular. The coat tends to be insufficiently formed if this pH is less than 7.0, while danger of runaway of reaction tends to increase if this pH exceeds 14.0.

When adding the compound containing at least one element selected from the group consisting of titanium, zirconium, zinc, iron, chromium and cerium and performing stirring or kneading in the aforementioned case, the temperature of the suspension is preferably at least 20° C., more preferably at least 30° C. in particular. Further, this temperature is preferably not more than 120° C., particularly preferably not more than 100° C. Formation of the coat tends to be insufficient if this temperature is less than 20° C., while there is a tendency that the coat is not homogeneously deposited outside each metal particle if this temperature exceeds 120° C.

When adding the compound containing at least one element selected from the group consisting of titanium, zirconium, zinc, iron, chromium and cerium and performing stirring or kneading in the aforementioned case, the time for the stirring or kneading is preferably at least 30 minutes, more preferably at least 1 hour in particular. Further, this time is preferably not more than 50 hours, particularly preferably not more than 20 hours. Deposition of the coat tends to insufficiently occur if this time is less than 30 minutes, while deposition of the coat tends not to further progress to result in economic disadvantage if this time exceeds 50 hours.

When finally performing heat treatment at a high temperature in the aforementioned case, the temperature for the heat treatment is preferably at least 250° C., more preferably at least 350° C. in particular. Further, this temperature is preferably not more than 800° C., particularly preferably not more than 650° C. Color development of the color metallic pigment tends to deteriorate if this temperature is less than 250° C., while agglomeration of the color metallic pigment tends to increase if this temperature exceeds 800° C.

When finally performing heat treatment at a high temperature in the aforementioned case, the time for the heat treatment is preferably at least 30 minutes, more preferably at least 1 hour in particular. This time is preferably not more than 10 hours, particularly preferably not more than 5 hours. Color development of the color metallic pigment tends to deteriorate if this time is less than 30 minutes, while there is a tendency that the metal particles flocculate or the color tone of the color metallic pigment darkens if this time exceeds 10 hours.

<Weather-Resistant Coat>

When the color metallic pigment according to the present invention has the second coat, the color metallic pigment preferably comprises a weather-resistant coat consisting of an oxide film containing at least one element selected from a group consisting of aluminum, silicon and cerium outside the second coat.

When the color metallic pigment according to the present invention has the second coat consisting of the oxide film or the oxynitride film elementally containing titanium, the color metallic pigment particularly preferably comprises the weather-resistant coat consisting of the oxide film containing at least one element selected from the group consisting of aluminum, silicon and cerium outside the second coat.

When the weather-resistant coat consisting of the oxide film containing at least one element selected from the group consisting of aluminum, silicon and cerium is formed outside the second coat consisting of the oxide film or the oxynitride film elementally containing titanium, photocatalytic activity of a titanium compound such as titanium oxide can be so reduced that it is possible to prevent a film formed by a paint compounded with the color metallic pigment according to the present invention from discoloration for improving weather resistance.

A compound having composition such as $Al_2O_3$, $SiO_2$, SiO, $CeO_2$ or $Ce_2O_3$ can be listed as a specific example of the compound containing at least one element selected from the group consisting of aluminum, silicon and cerium contained in this weather-resistant coat.

The thickness of this weather-resistant coat is preferably at least 0.01 μm, more preferably at least 0.02 μm in particular. Further, this thickness is preferably not more than 0.5 μm, more preferably not more than 0.2 μm in particular. There is a tendency that photocatalytic activity of the titanium compound cannot be sufficiently suppressed if this thickness is less than 0.01 μm, while the luster of the color metallic pigment tends to be damaged if this thickness exceeds 0.5 μm.

The quantity of at least one element selected from the group consisting of aluminum, silicon and cerium contained in this weather-resistant coat is preferably at least 0.01 parts by mass with respect to 100 parts by mass of the metal particles forming the base particles, more preferably at least 0.1 parts by mass in particular. Further, this quantity is preferably not more than 5.0 parts by mass, more preferably not more than 2.0 parts by mass in particular. There is a tendency that photocatalytic activity of the titanium compound cannot be sufficiently suppressed if this quantity is less than 0.01 parts by mass, while the luster of the color metallic pigment tends to lower if this quantity exceeds 5.0 parts by mass.

<Weather-Resistant Coat Forming Step>

While a method of forming the weather-resistant coat consisting of the oxide film containing at least one element selected from the group consisting of aluminum, silicon and cerium outside the second coat of the color metallic pigment according to the present invention is not particularly restricted, a method similar to the aforementioned silicon-aluminum coat forming step, for example, is preferable as a method of forming a weather-resistant coat consisting of an oxide film containing at least one element selected from a group consisting of aluminum and silicon among these methods.

Further, a method of adding a cerium compound to a slurried or pasty suspension prepared by suspending the metal particles each having the cobalt coat and the second coat in a hydrophilic solvent and performing heating/stirring or heating/kneading while keeping the pH of the suspension basic thereby forming a hydrated film elementally containing cerium on the surface of the second coat provided on the metal particle for finally performing heat treatment at a high temperature and converting the hydrated film to an oxide film is preferable as a method of forming a weather-resistant coat consisting of an oxide film elementally containing cerium among the aforementioned methods. It is recommended to previously solid-liquid separate the paste containing the metal particles each having the hydrated film from the aforementioned suspension before the final heat treatment.

While the cerium compound employed in the aforementioned method is not particularly restricted, cerium acetate, cerium nitrate or cerium alkoxide can be listed, for example.

Further, while the hydrophilic solvent employed for the suspension in the aforementioned case is not particularly restricted, methyl alcohol, ethyl alcohol, isopropyl alcohol, n-propyl alcohol, t-butyl alcohol, n-butyl alcohol, isobutyl alcohol, ethyl cellosolve, butyl cellosolve, propylene glycol monobutyl ether, dipropylene glycol monomethyl ether, propylene glycol monopropyl ether or acetone can be listed. The aforementioned suspension may contain water.

When performing heating/stirring or heating/kneading with addition of the cerium compound in the aforementioned case, the pH of the suspension is preferably at least 7.0, more preferably at least 8.0 in particular. Further, this pH is preferably not more than 14.0, more preferably not more than 10.0 in particular. The coat tends to be insufficiently formed if this pH is less than 7.0, while danger of runaway of reaction tends to increase if this pH exceeds 14.0.

<Resin Composition>

The resin composition according to the present invention is a resin composition containing the color metallic pigment according to the present invention and resin. Throughout the specification, it is assumed that the description "resin composition" includes a paint and a film thereof, ink and a film thereof and a resin composition molding prepared by injection molding or the like.

The color metallic pigment according to the present invention can be preferably compounded with a resin composition such as a paint or ink along with binder resin. The resin composition such as a paint or ink compounded with the color metallic pigment according to the present invention may be of any type such as an organic solvent type or aqueous composition, or powder coating. The color metallic pigment according to the present invention is particularly preferably compounded with an aqueous resin composition such as a water-based paint or water-color ink among these diverse types of resin compositions.

The content of the color metallic pigment according to the present invention in the resin composition according to the present invention is preferably at least 0.1 percent by mass, particularly preferably at least 1.0 percent by mass. Further, this content is preferably not more than 30 percent by mass, particularly preferably not more than 20 percent by mass. There is a tendency that sufficient metallic effect cannot be obtained if this content is less than 0.1 percent by mass while bad influence may be exerted on physical properties of the resin composition such as weather resistance, corrosion resistance and mechanical strength if this content exceeds 30 percent by mass.

While the resin contained in the resin composition according to the present invention is not particularly restricted but resin generally employed as a binder in a resin composition such as a paint or ink can be preferably employed, acrylic resin, alkyd resin, polyester resin, polyurethane resin, polyvinyl acetate resin, nitrocellulose resin or fluorocarbon resin can be listed, for example.

The resin composition according to the present invention may contain water, an organic solvent or the like.

Further, the resin composition according to the present invention may contain a pigment or an additive at need in a range not damaging the characteristics of the resin composition according to the present invention, in addition to the color metallic pigment according to the present invention and the resin.

While the pigment compoundable with the resin composition according to the present invention is not particularly restricted, phthalocyanine, quinacridone, isoindolinone, perylene, azo lake, iron oxide, chrome yellow, carbon black, titanium oxide, pearl mica, other extender pigments, a color pigment or a dye can be listed, for example.

While the additive compoundable with the resin composition according to the present invention is not particularly restricted, a surface active agent, a hardener, an ultraviolet absorber, a static eliminator or a thickener can be listed, for example.

While the material of a base for applying the resin composition according to the present invention as a paint or ink is not particularly restricted, a base consisting of paper, wood, fabric, plastic or metal, can be listed, for example. The resin composition according to the present invention can be preferably applied to any base by properly selecting the type and the composition of the binder resin compounded with the resin composition.

When employing the resin composition according to the present invention as a paint or ink, the resin composition may be directly applied to the base, while the base may be provided with an undercoating layer or an intermediate layer by electrodeposition coating or the like on a substrate for applying the resin composition thereto.

When employing the resin composition according to the present invention is employed as a paint or ink, a film consisting of the resin composition according to the present invention may form the outermost layer, while a topcoat layer may be formed on the film consisting of the resin composition according to the present invention.

While the present invention is now described in more detail with reference to Examples, the present invention is not restricted to these.

EXAMPLE 1

First, a solution obtained by adding 0.3 g of metallic molybdenum powder to 3 g of hydrogen peroxide water containing 30% (w/v) of hydrogen peroxide piecemeal and making reaction was dissolved in 200 g of isopropyl alcohol (hereinafter abbreviated as IPA), and 40 g (30 g as aluminum content) of commercially available aluminum particles (5422NS by Toyo Aluminum K.K., solid content: 75% (w/w), average particle diameter: 19 μm, average thickness: 1 μm) were further added to the solution for preparing slurry, which in turn was stirred/mixed at 75° C. for 1 hour.

Thereafter monoethanolamine was added to the aforementioned slurry, for adjusting the pH value of the slurry to 10.0. 15 g of cobalt acetate (II) tetrahydrate was dissolved in 40 g of water and added to the pH-adjusted slurry, which in turn was further stirred/mixed at 75° C. for 2 hours.

After completion of reaction, the slurry was solid-liquid separated through a filter, and the obtained aluminum pigment (hardly colored) was heat-treated in the air at 500° C. for 3 hours. The heat-treated aluminum pigment presented yellow-green, and had excellent metallic effect.

EXAMPLE 2

12 g of tetrabutoxy titanium, 0.5 g of monoethanolamine and 10 g of water were added to slurry prepared by dispersing 30 g of the aluminum pigment obtained in Example 1 in 200 g of IPA, and stirred/mixed at 75° C. for 2 hours for making reaction.

After completion of the reaction, the slurry was solid-liquid separated through a filter, and the obtained aluminum pigment was heat-treated in an argon atmosphere at 600° C. for 3 hours. The heat-treated aluminum pigment presented an appearance varying from pink to gold with the angle of observation, and had excellent metallic effect.

EXAMPLE 3

0.3 g of phosphoric acid (active ingredient: 98% (w/w)) was dissolved in 200 g of isopropyl alcohol (hereinafter abbreviated as IPA), 40 g (30 g as aluminum content) of commercially available aluminum particles (5422NS by Toyo Aluminum K.K.) and ethylenediamine were added for adjusting the pH value of the slurry to 10.0, and the slurry was stirred/mixed at 75° C. for 1 hour.

Thereafter 10 g of cobalt nitrate (II) hexahydrate was dissolved in 40 g of IPA and added to the aforementioned slurry, which in turn was further stirred/mixed at 75° C. for 2 hours.

After completion of reaction, the slurry was solid-liquid separated through a filter, and the obtained aluminum pigment (hardly colored) was heat-treated in the air at 300° C. for 3 hours. The heat-treated aluminum pigment presented pale yellow, and had excellent metallic effect.

EXAMPLE 4

12 g of tetraisopropoxy titanium, 1.5 g of dibutoxybis (triethanolaminato)titanium and 10 g of water were added to slurry prepared by dispersing 30 g of the aluminum pigment obtained in Example 3 in 200 g of IPA, and stirred/mixed at 75° C. for 2 hours for making reaction.

After completion of the reaction, the slurry was solid-liquid separated through a filter, and the obtained aluminum pigment was heat-treated in an argon atmosphere at 600° C. for 3 hours. The heat-treated aluminum pigment presented an appearance varying from blue to purple with the angle of observation, and had excellent metallic effect.

EXAMPLE 5

0.6 g of phosphomolybdic acid was dissolved in 200 g of dipropylene glycol monomethyl ether, 40 g (30 g as aluminum content) of commercially available aluminum particles (5422NS by Toyo Aluminum K.K.) were added thereto, and stirred/mixed at 90° C. for 1 hour.

Thereafter γ-aminopropyl triethoxysilane was added to the aforementioned slurry, for adjusting the pH value of the slurry to 9.5.

30 g of cobalt oxalate (II) dihydrate was dissolved in 40 g of water and added to the pH-adjusted slurry, which in turn was further stirred/mixed at 90° C. for 2 hours. After completion of reaction, the slurry was solid-liquid separated through a filter, and the obtained aluminum pigment (hardly colored) was heat-treated in the air at 300° C. for 3 hours. The heat-treated aluminum pigment presented green, and had excellent metallic effect.

EXAMPLE 6

18 g of tetrabutoxy titanium and 3 g of a 10% (w/v) ammonia aqueous solution were added to slurry prepared by dispersing 30 g of the aluminum pigment obtained in Example 5 in 200 g of ethyl alcohol, and stirred/mixed at 75° C. for 2 hours for making reaction.

After completion of the reaction, the slurry was solid-liquid separated through a filter, and the obtained aluminum pigment was heat-treated in nitrogen at 600° C. for 3 hours. The heat-treated aluminum pigment presented an appearance varying from green to brown with the angle of observation, and had excellent metallic effect.

EXAMPLE 7

Polyphosphoric acid was dissolved in 200 g of isopropyl alcohol, 40 g (30 g as aluminum content) of commercially available aluminum particles (5422NS by Toyo Aluminum K.K.) were added and stirred/mixed at 50° C. for 1 hour. Thereafter monoethanolamine was added to the aforementioned slurry for adjusting the pH value of the slurry to 8.5.

40 g of triisopropoxy aluminum (hereinafter abbreviated as TEOS) was added to the pH-adjusted slurry, which in turn was further stirred/mixed at 50° C. for 10 hours. In the course of this process, the pH value of the slurry was checked every 2 hours, and the pH value was adjusted to 8.5 by adding monoethanolamine.

Thereafter 5 g of cobalt acetate (II) tetrahydrate was added to the slurry, which in turn was stirred/mixed at 75° C. for 2 hours. After completion of reaction, the slurry was solid-liquid separated through a filter, and the obtained aluminum pigment was heat-treated in nitrogen at 300° C. for 3 hours. The heat-treated aluminum pigment presented beige, and had excellent metallic effect.

EXAMPLE 8

30 g of tetrabutoxy titanium, 3 g of triethanolamine and 15 g of water were added to slurry obtained by dispersing 30 g of the aluminum pigment obtained in Example 7 in 200 g of IPA, and stirred/mixed at 75° C. for 2 hours, for making reaction.

After completion of the reaction, the slurry was solid-liquid separated through a filter, and the obtained aluminum pigment was heat-treated in the air at 500° C. for 3 hours. The heat-treated aluminum pigment presented an appearance varying from pale green to pink with the angle of observation, and had excellent metallic effect.

EXAMPLE 9

5 g of tetraethoxysilane and 15 g of a 10% (w/v) ammonia aqueous solution were added to slurry prepared by dispersing 30 g of the aluminum pigment obtained in Example 8 in 200 g of IPA, and stirred/mixed at 75° C. for 5 hours, for making reaction.

After completion of the reaction, the slurry was solid-liquid separated through a filter, and the obtained aluminum pigment was heat-treated in a nitrogen atmosphere at 600° C. for 3 hours. The heat-treated aluminum pigment presented an appearance varying from pale green to pink with the angle of observation, and had excellent metallic effect.

EXAMPLE 10

4.5 g of aluminum nitrate and 15 g of a 10% (w/v) ammonia aqueous solution were added to slurry prepared by dispersing 30 g of the aluminum pigment obtained in Example 8 in 200 g of water, and stirred/mixed at 75° C. for 5 hours, for making reaction.

After completion of the reaction, the slurry was solid-liquid separated through a filter, and the obtained aluminum pigment was heat-treated in an argon atmosphere at 600° C. for 3 hours. The heat-treated aluminum pigment presented an appearance varying from pale green to pink with the angle of observation, and had excellent metallic effect.

EXAMPLE 11

5 g of cerium acetate (III) monohydrate and 15 g of a 10% (w/v) ammonia aqueous solution were added to slurry prepared by dispersing 30 g of the aluminum pigment obtained in Example 8 in 200 g of water, and stirred/mixed at 75° C. for 5 hours, for making reaction.

After completion of the reaction, the slurry was solid-liquid separated through a filter, and the obtained aluminum pigment was heat-treated in the air at 550° C. for 3 hours. The heat-treated aluminum pigment presented an appearance varying from pale green to pink with the angle of observation, and had excellent metallic effect.

EXAMPLE 12

40 g (30 g as aluminum content) of commercially available aluminum particles (5422NS by Toyo Aluminum K.K.) and monoethanolamine were added to 200 g of dipropylene glycol monomethyl ether for adjusting the pH value of slurry to 10.0.

15 g of cobalt acetate (II) tetrahydrate was dissolved in 40 g of water and added to the pH-adjusted slurry, which in turn was further stirred/mixed at 75° C. for 2 hours. In the course of this process, the aluminum particles reacted in the slurry and generated a large quantity of hydrogen gas, to finally provide brown slurry.

After completion of the reaction, the slurry was solid-liquid separated through a filter, 30 g of tetrabutoxy titanium, 3 g of triethanolamine and 15 g of water were added to slurry prepared by re-dispersing the obtained aluminum pigment in 200 g of IPA, and stirred/mixed at 75° C. for 2 hours, for making reaction.

After completion of the reaction, the slurry was solid-liquid separated through a filter, and the obtained aluminum pigment was heat-treated in nitrogen at 600° C. for 3 hours. The heat-treated aluminum pigment presented an appearance varying from red to orange with the angle of observation, and had excellent metallic effect.

Comparative Example 1

15 g of tetrabutoxy titanium was added to slurry prepared by dispersing 30 g of aluminum particles prepared by cleaning commercially available aluminum particles (5422NS by Toyo Aluminum K.K.) with acetone, thereafter sucking/filtrating the same and drying the same at 50° C. for 2 hours in 300 g of n-butanol, and a solution prepared by dissolving 7.5 g of water in 50 g of n-butanol was gradually added thereto for making reaction at 75° C. for 1 hour.

After completion of the reaction, the slurry was solid-liquid separated through a filter, and the obtained aluminum pigment was heat-treated in the air at 250° C. for 15 minutes. The heat-treated aluminum pigment was silver and hardly colored. Coarse particles of an aggregate resulting from reaction between water and aluminum were mixed into powder containing the heat-treated aluminum.

Comparative Example 2

60 g of cobalt nitrate (II) hexahydrate, 30 g of oxalic acid and 45 g of iron-EDTA-chelate were dissolved in 1000 g of water, and 120 g of triethanolamine and a 1N sodium hydroxide solution were added for preparing a solution adjusted to 7.3 in pH value.

While 30 g of aluminum particles prepared by cleaning commercially available aluminum particles (5422NS by Toyo Aluminum K.K.) with acetone, thereafter sucking/filtrating the same and drying the same at 50° C. for 2 hours and 500 g of ethanol were added to this solution, which in turn was heated at 85° C. for 10 minutes, generation of hydrogen gas resulting from reaction between the treatment solution and the aluminum pigment was recognized during the treatment.

5000 g of water was added to this slurry, which in turn was thereafter solid-liquid separated through a filter. While beige powder was mixed into the obtained aluminum pigment, the aluminum pigment itself was hardly colored. A large aggregate resulting from reaction between water and aluminum was mixed into powder containing the aluminum pigment.

Comparative Example 3

120 g of water and 10 g of a 25% (w/v) ammonia aqueous solution were added to slurry prepared by dispersing 30 g of aluminum particles prepared by cleaning commercially available aluminum particles (5422NS by Toyo Aluminum K.K.) with acetone, thereafter sucking/filtrating the same and drying the same at 50° C. for 2 hours in 300 g of IPA, and heated to 60° C.

Thereafter a solution prepared by dissolving 90 g of tetraethoxysilane in 120 g of IPA was gradually added for 3 hours, and thereafter reacted at 55° C. for 14 hours. During the treatment step, the aluminum particles reacted with the treatment solution, to generate a large quantity of hydrogen gas. After completion of the reaction, the slurry was solid-liquid separated through a filter, and the obtained aluminum pigment was dried in the air at 80° C. for 3 hours.

While a large aggregate resulting from reaction of water and aluminum was mixed into powder containing the heat-treated aluminum pigment, this was passed through a sieve of 45 µm, and 20 g of obtained powder was re-dispersed in 200 g of IPA. 10 g of tetrabutoxy titanium, 2 g of triethanolamine and 10 g of water were added to this slurry, which in turn was stirred/mixed at 75° C. for 2 hours, for making reaction.

After completion of the reaction, the slurry was solid-liquid separated through a filter, and the obtained aluminum pigment was heat-treated in nitrogen at 600° C. for 3 hours. While the heat-treated aluminum pigment presented an appearance varying from beige to orange with the angle of observation, this was an aluminum pigment having less metallic effect with a large quantity of aggregates.

<Preparation of Water-Based Metallic Base Paint>

Each of the aluminum pigments obtained in Examples 1 to 12 and comparative examples 1 to 3 was used for preparing a water-based metallic base paint in the following composition. The finally heat-treated aluminum pigment was employed as the aluminum pigment. Aluminum pigments passed through a sieve of 45 µm in pore size were used as the aluminum pigments obtained in comparative examples 1 to 3.

| [Composition of Water-Based Metallic Base Paint] | |
| --- | --- |
| water-soluble acrylic resin (*1) | 28.2 g |
| melamine resin (*2) | 4.4 g |
| triethanolamine | 1.1 g |
| deionized water | 44.8 g |
| isopropyl alcohol | 3.0 g |
| aluminum pigment (*3) | 3.0 g as solid content |

In the aforementioned composition, it is assumed that the respective symbols denote the following substances:
*1: Armatex WA911 by Mitsui Chemicals
*2: Cymel 350 by Mitsui Chemicals
*3: aluminum pigments obtained in Examples 1 to 12 or comparative examples 1 to 3

<Preparation of Painted Plate>

Each of the aforementioned water-based metallic base paints prepared with the aluminum pigments obtained in Examples 1 to 12 or comparative examples 1 to 3 was applied to a test steel plate previously electrodeposition-coated with a primary rust prevention paint by air spraying so that the thickness of the dried film was 13 µm, and the steel plate was predried at 90° C. for 10 minutes, coated with an organic solvent-type topcoat paint having the following composition by air spraying so that the thickness of the dried film was 40 µm and dried at 130° C. for 30 minutes, thereby preparing a metallic painted plate.

| [Composition of Organic Solvent-Type Topcoat Paint] | |
| --- | --- |
| acrylic resin (*1) | 140 g |
| melamine resin (*2) | 50 g |
| Solvesso 100 | 60 g |

In the aforementioned composition, it is assumed that the respective symbols denote the following substances:
*1: Armatex 110 by Mitsui Chemicals
*2: Uban 20SE60 by Mitsui Chemicals <Performance Evaluation>

As to the metallic painted plates containing the aluminum pigments obtained according to Examples 1 to 12 or comparative examples 1 to 3 as described above in the film, items of appearance, hue, chroma, color traveling (property of the hue varying with the angle of observation) and metallic effect of the film of each painted plate were evaluated according to the following evaluation methods. Table 1 shows the obtained results of evaluation.

(i) Method of Evaluating Appearance of Film

The appearance of the film of the metallic painted plate was visually observed and evaluated according to the following criteria of evaluation:

5: surface extremely smooth
4: surface smooth
3: surface waved but lustered
2: surface finely irregular
1: surface grained (ii) Method of Evaluating Hue of Film The hue of the film of the metallic painted plate was visually observed while varying the angle of observation, for evaluating the observed color or the way of variation of the color.

(iii) Method of Evaluating Chroma of Film

The chroma of the film of the metallic painted plate was evaluated according to the following criteria of evaluation by measuring the $c$ value ($=(a^2+b^2)^{1/2}$) with a differential calorimeter (SM-6-CH by Suga Test Instruments Co., Ltd.):

5: $20 \leq c$
4: $15 \leq c < 20$
3: $10 \leq c < 15$
2: $5 \leq c < 10$
1: $c < 5$ (iv) Method of Evaluating Color Traveling of Film The appearance of the film of the metallic painted plate was visually observed and evaluated according to the following criteria of evaluation:

5: hues of colors in the direction of specular reflection and the direction of diffuse reflection remarkably varied 4: hues of colors in the direction of specular reflection and the direction of diffuse reflection varied in the same system 3: hues of colors in the direction of specular reflection and the direction of diffuse reflection remained similar with variation of brightness 2: colors in the direction of specular reflection and the direction of diffuse reflection slightly varied in hue or brightness 1: colors in the direction of specular reflection and the direction of diffuse reflection hardly varied (v) Method of Evaluating Metallic Effect of Film The appearance of the film of the metallic painted plate was visually observed and evaluated according to the following criteria of evaluation:

5: exhibited metallic effect equivalent to that in a case of employing untreated aluminum particles 4: exhibited metallic effect, though slightly inferior to that in the case of employing untreated aluminum particles 3: passably exhibited metallic effect, though considerably inferior to that in the case of employing untreated aluminum particles 2: metallic effect remarkably lowered as compared with that in the case of employing untreated aluminum particles 1: hardly exhibited metallic effect (vi) Method of Evaluating Weather Resistance of Film The metallic painted plate was subjected to ultraviolet irradiation for 1000 hours with a QUV acceleration weather meter (QUV/SE by Q-Panel Company) and variation of color difference before and after the test was measured with a differential calorimeter (SM-6-CH by Suga Test Instruments Co., Ltd.) thereby evaluating the weather resistance of the film. It can be said that a film having smaller variation of color difference has superior weather resistance.

It is understood from the results shown in Table 1 that the films of the metallic painted plates employing the aluminum pigments obtained according to Examples 1 to 12 of the present invention are remarkably superior in the items of appearance, hue, color traveling, metallic effect and weather resistance of the films as compared with the films of the metallic painted plates employing the aluminum pigments obtained according to comparative examples 1 to 3.

It is also understood from the results shown in Table 1 that the films of the metallic painted plates employing the aluminum pigments obtained according to Examples 1 to 12 of the present invention are colored in diverse hues including colors having hues varying with the angles of observation.

The embodiment and Examples disclosed this time must be considered as illustrative in all points and not restrictive. The scope of the present invention is shown not by the above description but by the scope of claim for patent, and it is intended that all modifications within the meaning and range equivalent to the scope of claim for patent are included.

INDUSTRIAL AVAILABILITY

It can be said from the aforementioned results that the color metallic pigment according to the present invention is a color metallic pigment capable of implementing colors of diverse hues including a color having a hue varied with the angle of observation, excellent in finished appearance, chroma, color traveling, metallic effect and weather resistance, and manufacturable by a safe and simple manufacturing method.

It can also be said that the resin composition according to the present invention, containing the color metallic pigment according to the present invention and resin, is a resin composition capable of implementing colors of diverse hues including a color having a hue varied with the angle of observation, excellent in finished appearance, chroma, color traveling, metallic effect and weather resistance, and manufacturable by a safe and simple manufacturing method.

TABLE 1

Results of Performance Evaluation of Films Containing Various Types of Aluminum Pigments

| Type of Aluminum Pigment | Results of Evaluation | | | | | |
|---|---|---|---|---|---|---|
| | Appearance | Hue | Chroma | Color Traveling | Metallic Effect | Variation of Color Difference |
| Example 1 | 5 | yellow-green | 4 | 2 | 5 | 0.3 |
| Example 2 | 4 | pink to gold | 4 | 5 | 5 | 0.6 |
| Example 3 | 5 | pale yellow | 3 | 2 | 5 | 0.2 |
| Example 4 | 4 | blue to purple | 5 | 5 | 4 | 0.5 |
| Example 5 | 5 | green | 5 | 2 | 5 | 0.3 |
| Example 6 | 4 | green to brown | 5 | 4 | 4 | 0.6 |
| Example 7 | 4 | beige | 3 | 3 | 5 | 0.2 |
| Example 8 | 4 | pale green to pink | 4 | 5 | 5 | 0.7 |
| Example 9 | 4 | pale green to pink | 4 | 5 | 4 | 0.3 |
| Example 10 | 4 | pale green to pink | 4 | 5 | 4 | 0.2 |
| Example 11 | 4 | pale green to pink | 4 | 5 | 4 | 0.1 |
| Example 12 | 4 | red to orange | 5 | 5 | 4 | 0.7 |
| Comparative Example 1 | 1 | uncolored | 1 | 1 | 3 | 3.5 |
| Comparative Example 2 | 1 | uncolored | 2 | 1 | 1 | 1.5 |
| Comparative Example 3 | 1 | beige to orange | 2 | 3 | 2 | 3.1 |

The invention claimed is:

1. A color metallic pigment comprising metal particles and a singlelayer or multilayer coat covering the surface of each said metal particle, further comprising a molybdenum-phosphorus coat consisting of an oxide film elementally containing molybdenum and/or phosphorus on the surface of each said metal particle, wherein said single-layer or multilayer coat is disposed on said molybdenum-phosphorus coat, and at least one layer of said single-layer or multilayer coat is a cobalt coat consisting of an anhydrous oxide film elementally containing cobalt.

2. The color metallic pigment according to claim 1, wherein said single-layer or multilayer coat further comprises a silicon-aluminum coat consisting of an oxide film elementally containing silicon and/or aluminum inside said cobalt coat.

3. The color metallic pigment according to claim 1, wherein said single-layer or multilayer coat further comprises a second coat consisting of an oxide film or an oxynitride film containing at least one element selected from a group consisting of titanium, zirconium, zinc, iron, chromium and cerium outside said cobalt coat.

4. The color metallic pigment according to claim 3, wherein said second coat consists of an oxide film or an oxynitride film elementally containing titanium.

5. The color metallic pigment according to claim 4, wherein said single-layer or multilaver coat further comprises a weather-resistant coat consisting of an oxide film containing at least one element selected from a group consisting of aluminum, silicon and cerium outside said second coat.

6. A resin composition containing the color metallic pigment according to claim 1 and resin.

7. The color metallic pigment according to claim 1, wherein said cobalt coat materially contains a compound having at least one composition selected from a group consisting of CoO, $Co_2O_3$, $Co_3O_4$, $nCoO.mAl_2O_3$ and $nCoO.mSiO_2$, and said m and said n are positive numbers.

8. The color metallic pigment according to claim 1, wherein the quantity of the cobalt element contained in said cobalt coat is in the range of 0.5 to 50 parts by mass with respect to 100 parts by mass of said metal particles.

9. The color metallic pigment according to claim 1, wherein said molybdenum-phosphorus coat materially contains a compound having at least one composition selected from a group consisting of $MoO_3$, $Mo_2O_3$, $MoO$, $nAl_2O_3.mMoO_3$, $nAl_2O_3.mMo_2O_3$, $nAl_2O_3.mMoO$, $P_2O_5$ and $nAl_2O_3mP_2O_5$, and said m and said n are positive real numbers.

10. The color metallic pigment according to claim 1, wherein the elemental quantity of molybdenum and/or phosphorus contained in said molybdenum-phosphorus coat is in the range of 0.01 to 5.0 parts by mass with respect to 100 parts by mass of said metal particles.

11. A color metallic pigment comprising coated particles, wherein a respective one of said coated particles comprises:
   a metal particle;
   an inner coat layer comprising an oxide of at least one element selected from the group consisting of molybdenum and phosphorus, disposed directly on a surface of said metal particle; and
   a cobalt-containing coat layer comprising an anhydrous oxide of at least cobalt, disposed directly or indirectly on said inner coat layer.

12. The color metallic pigment according to claim 11, wherein said cobalt-containing coat layer is disposed directly on said inner coat layer.

13. The color metallic pigment according to claim 11, wherein said respective coated particle further comprises an intermediate coat layer disposed between said inner coat layer and said cobalt-containing coat layer, wherein said cobalt-containing coat layer is disposed indirectly on said inner coat layer.

14. The color metallic pigment according to claim 13, wherein said intermediate coat layer comprises an oxide of at least one element selected from the group consisting of silicon and aluminum.

15. The color metallic pigment according to claim 11, wherein said respective coated particle further comprises a further coat layer comprising an oxide or an oxynitride, of at least one element selected from the group consisting of titanium, zirconium, zinc, iron, chromium and cerium, disposed outside said cobalt-containing coat layer.

16. The color metallic pigment according to claim 15, wherein said respective coated particle further comprises a weather-resistant coat layer comprising an oxide of at least one element selected from the group consisting of aluminum, silicon and cerium, disposed outside said further coat layer.

17. The color metallic pigment according to claim 11, wherein said cobalt-containing coat layer contains an amount of cobalt in a range from 1 to 30 parts by mass with respect to 100 parts by mass of said metal particle, and said inner coat layer contains an amount of said molybdenum and/or said phosphorus in a range from 0.05 to 2.0 parts by mass with respect to 100 parts by mass of said metal particle.

* * * * *

UNITED STATES PATENT AND TRADEMARK OFFICE
CERTIFICATE OF CORRECTION

| | |
|---|---|
| PATENT NO. | : 7,045,212 B2 |
| APPLICATION NO. | : 10/510012 |
| DATED | : May 16, 2006 |
| INVENTOR(S) | : Hashizume et al. |

Page 1 of 1

It is certified that error appears in the above-identified patent and that said Letters Patent is hereby corrected as shown below:

Column 2,
Line 48, after "Patent.", replace "laying-Open" by --Laying-Open--;

Column 4,
Line 63, after "the", replace "rage" by --range--;

Column 22,
Line 61, replace "calorimeter" by --colorimeter--;

Column 23,
Line 36, after "differential", replace "calorimeter" by --colorimeter--;

Column 25,
Line 3, after "a", replace "singlelayer" by --single-layer--;
Line 27, after "or", replace "multilaver" by --multilayer--;
Line 37, after "$Co_3O_4$,", replace "$nCoO.mAl_2O_3$" by --$nCoO·mAl_2O_3$--;
Line 38, before ", and said m", replace "$nCoO.mSiO_2$" by --$nCoO ·mSiO_2$--;
    by --$nAl_2O_3·mMoO_3$, $nAl_2O_3·mMo_2O_3$, $nAl_2O_3·mMoO$,--;
Line 48, before ", and said m", replace "$nAl_2O_3mP_2O_5$" by --$nAl_2O_3·mP_2O_5$--.

Signed and Sealed this

Thirteenth Day of February, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,045,212 B2 |
| APPLICATION NO. | : 10/510012 |
| DATED | : May 16, 2006 |
| INVENTOR(S) | : Hashizume et al. |

It is certified that error appears in the above-identified patent and that said Letters Patent is hereby corrected as shown below:

Column 2,
Line 48, after "Patent.", replace "laying-Open" by --Laying-Open--;

Column 4,
Line 63, after "the", replace "rage" by --range--;

Column 22,
Line 61, replace "calorimeter" by --colorimeter--;

Column 23,
Line 36, after "differential", replace "calorimeter" by --colorimeter--;

Column 25,
Line 3, after "a", replace "singlelayer" by --single-layer--;
Line 27, after "or", replace "multilaver" by --multilayer--;
Line 37, after "Co$_3$O$_4$,", replace "nCoO.mAl$_2$O$_3$" by --nCoO·mAl$_2$O$_3$--;
Line 38, before ", and said m", replace "nCoO.mSiO$_2$" by --nCoO ·mSiO$_2$--;
Line 47, before "P$_2$O$_5$", replace "nAl$_2$O$_3$.mMoO$_3$, nAl$_2$O$_3$.mMo$_2$O$_3$, nAl$_2$O$_3$.mMoO," by --nAl$_2$O$_3$·mMoO$_3$, nAl$_2$O$_3$·mMo$_2$O$_3$, nAl$_2$O$_3$·mMoO,--;
Line 48, before ", and said m", replace "nAl$_2$O$_3$mP$_2$O$_5$" by --nAl$_2$O$_3$·mP$_2$O$_5$--.

This certificate supersedes Certificate of Correction issued February 13, 2007.

Signed and Sealed this

Eighth Day of May, 2007

JON W. DUDAS
*Director of the United States Patent and Trademark Office*